F. G. BLACK.
HARNESS ATTACHMENT.
APPLICATION FILED JUNE 14, 1910.

976,719.

Patented Nov. 22, 1910.

Witnesses
Thos. F. Knox,
K. Allen

Inventor
Frank G. Black
By Victor J. Evans
Attorney

THE NORRIS PETERS CO., WASHINGTON, D. C.

UNITED STATES PATENT OFFICE.

FRANK G. BLACK, OF FAIRFIELD, ILLINOIS.

HARNESS ATTACHMENT.

976,719.  Specification of Letters Patent.  Patented Nov. 22, 1910.

Application filed June 14, 1910. Serial No. 566,800.

*To all whom it may concern:*

Be it known that I, FRANK G. BLACK, a citizen of the United States, residing at Fairfield, in the county of Wayne and State of Illinois, have invented new and useful Improvements in Harness Attachments, of which the following is a specification.

This invention relates to improvements in attachments for harness and more particularly to the class of attachments employed for connecting a trace with the whiffle-tree.

One object of the invention is the provision of an attachment comprising a member to receive the trace end and a cock eye to receive the whiffle-tree end, and a connection between the trace attachment and cock eye adapted to permit of a relative turning movement between the trace attachment and cock eye.

Another object is the provision of a member to receive the trace end, so constructed that adjustment of the trace will be permitted according to the length of the animal to which the trace is applied, and at the same time to hold the overlapping end of the trace and prevent the same from flapping after adjustment is effected.

With these and other objects in view, which will more fully hereinafter appear, the present invention consists in certain novel details of construction and arrangement of parts, hereinafter fully described, illustrated in the accompanying drawings and more particularly pointed out in the appended claim; it being understood that various changes in the form, proportion, size, and minor details of the device may be made, within the scope of the appended claim, without departing from the spirit or sacrificing any of the advantages of the invention.

Figure 1:
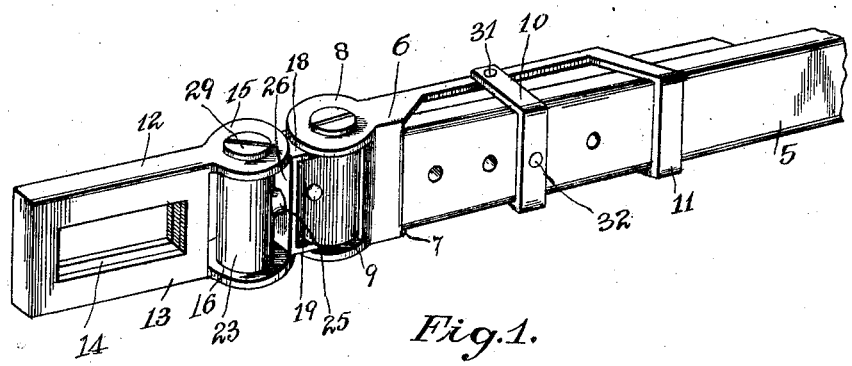
Figure 2:
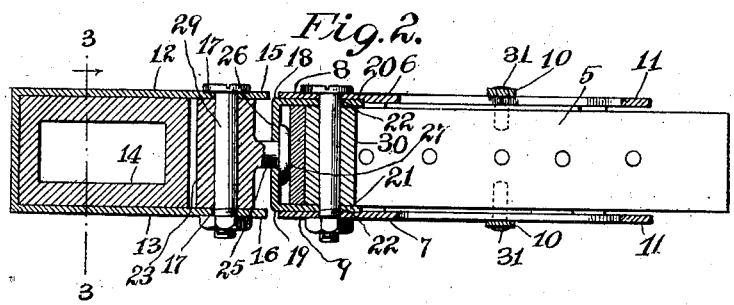
Figure 3:
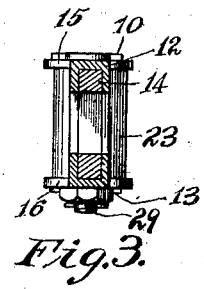

In the accompanying drawing:—Figure 1 is a perspective view of a trace end provided with my improved device; Fig. 2 is a longitudinal sectional view taken through the device when the parts thereof are connected; Fig. 3 is a sectional end view on the line 3—3 of Fig. 2.

Similar numerals of reference designate corresponding parts throughout.

The trace is designated in general by the numeral 5. The attachment for receiving the end of the trace is shown to include oblong side members 6 and 7, terminating at one end in circular heads 8 and 9. The side members 6 and 7 are connected and held in spaced relation by means of a pair of substantially U-shaped straps 10 and 11, arranged at the intermediate portions and at the ends of the side members remote from the heads 8 and 9.

The cock eye or attachment for receiving the whiffle tree end is preferably formed from a single piece of metal, cast or otherwise formed into a substantially U-shape, the opposite limbs of which are designated by the numerals 12 and 13. The limbs 12 and 13, also the portion connecting said limbs, are channeled and insertible into the channeled portions is an oblong piece of leather 14 having an elongated opening for the reception of the end of the whiffle tree. The limbs 12 and 13 terminate in enlarged circular heads 15 and 16, provided with centrally disposed alining vertical openings 17.

The member connecting the cock eye with the trace receiving member comprises two sections, one of which is formed from a single piece of metal, cast or otherwise formed into a U-shape, the opposite limbs of which are designated by the numerals 18 and 19, the space between said limbs corresponding approximately to the distance between the opposed inner faces of the circular heads 8 and 9 of the trace receiving member. The limbs 18 and 19 terminate in enlarged circular heads 20 and 21, the said heads having centrally disposed alining vertical openings 22. The other section of the connecting member is a tubular or sleeve shaped structure designated by the numeral 23 and may be formed of wood, metal or other material suitable for the purpose. The length of the member 23 corresponds approximately to the distance between the opposed inner faces of the circular heads 15 and 16 of the cock eye. Extending radially from the central portion of the member 23 is an arm 25 which is loosely fitted in an opening formed in the middle of the portion 26 connecting the limbs 18 and 19 of the first described section, the extremity of the arm 25 being provided with a head 27 of greater diameter than the opening through which the arm extends and serving to prevent disengagement of the sections.

A bushing 30 of wood or metal, somewhat less in length than the space between the opposed inner faces of the circular heads 8 and 9 of the trace receiving member, is positioned between the said heads with its axis in alinement with central openings formed in the said heads 8 and 9. When the bushing is so positioned, the circular heads 20 and 21 of the connecting section pass through the openings between the heads 8 and 9, and bushing, and a pivot pin is passed through the alining openings and bushing. The sleeve member 23 is then inserted between the heads 15 and 16 of the cock eye and a similar pivot pin 29 passed through the alining openings of the said heads. In connecting the trace, the rear end of the latter is passed between the U-shaped straps 10 and 11 and then trained around the bushing and directed forwardly. It will be seen by reference to the drawings that a pin 31 depends from one limb of the intermediate strap 10, the forwardly directed portion of the trace end being passed over the inner side of the said pin, and projecting inwardly from the medial portion of the strap 10 is a pin 32, which engages any of the openings formed in the trace end.

With this construction, it will be manifest that the trace may be adjusted according to the length of the animal, and when the cock eye is in engagement with the swingle tree, a relative movement will be permitted between the trace receiving member and cock eye by virtue of the connection between the trace receiving member and cock eye. With the foregoing, the parts are intended for use with light carriage harness or what is known as one-ply traces. Whenever heavy traces are to be employed, the member connecting the cock eye portion with the trace holding portion is manipulated and the terminals of the cock eye portion are inserted between the terminals of the trace holding portion, the parts being secured by means of one of the bolts. In this connection, the trace is passed over the bushing 30 and secured in the manner described before.

Having thus described the invention, what I claim is:

A trace attachment comprising a trace receiving member, a U-shaped cock eye having its opposite limbs channeled, and a member including a pair of sections pivotally connected at one end and having their opposite ends pivotally secured to the trace receiving member and cock eye.

In testimony whereof I affix my signature in presence of two witnesses.

FRANK G. BLACK.

Witnesses:
CLYDE B. ALEXANDER,
ALVIN I. STEINER.